United States Patent
Stalp

(10) Patent No.: US 6,938,625 B2
(45) Date of Patent: Sep. 6, 2005

(54) LOAD SENSING SYSTEM

(76) Inventor: Timothy L. Stalp, 340 S. Beemer St., West Point, NE (US) 68788

( * ) Notice: Subject to any disclaimer, the term of this patent is extended or adjusted under 35 U.S.C. 154(b) by 427 days.

(21) Appl. No.: 10/295,846

(22) Filed: Nov. 18, 2002

(65) Prior Publication Data
US 2004/0094188 A1 May 20, 2004

(51) Int. Cl.$^7$ .............................................. B08B 13/00
(52) U.S. Cl. ...................... 134/56 R; 134/113; 134/117
(58) Field of Search ............................ 134/56 R, 57 R, 134/117, 118, 113

(56) References Cited

U.S. PATENT DOCUMENTS

| | | | |
|---|---|---|---|
| 1,609,652 A | | 12/1926 | McQueen |
| 1,695,021 A | | 12/1928 | Puryear |
| 1,868,268 A | * | 7/1932 | Zrebiec |
| 1,972,195 A | | 9/1934 | Lacy, Jr. |
| 2,025,841 A | | 12/1935 | Young |
| 2,050,458 A | | 8/1936 | Ovestrud et al. |
| 2,324,549 A | | 7/1943 | Wigton |
| 2,336,991 A | | 12/1943 | Leveke |
| 2,384,898 A | * | 9/1945 | Dietert |
| 2,489,161 A | | 11/1949 | Scholes |
| 2,578,804 A | * | 12/1951 | Holveck et al. |
| 2,630,153 A | * | 3/1953 | Dick |
| 3,353,796 A | * | 11/1967 | Roberts |
| 3,633,593 A | * | 1/1972 | Slaats ....................... 134/64 R |
| 3,807,558 A | | 4/1974 | Hamm |
| 4,198,153 A | * | 4/1980 | Hamlin ........................ 396/627 |
| 4,234,415 A | | 11/1980 | de Tuya Casuso |
| 4,448,678 A | | 5/1984 | Gentry |
| 4,640,327 A | * | 2/1987 | Krilov ........................ 144/340 |
| 4,821,754 A | * | 4/1989 | Weil ......................... 134/64 R |
| 4,874,003 A | * | 10/1989 | Weil ........................... 134/111 |
| 5,103,883 A | * | 4/1992 | Viikari et al. ............... 144/342 |
| 5,868,256 A | | 2/1999 | Teppo |
| 5,992,776 A | | 11/1999 | Arcaini et al. |
| 6,752,274 B2 | * | 6/2004 | Mirras ........................ 209/464 |

FOREIGN PATENT DOCUMENTS

| | | |
|---|---|---|
| GB | 2 280 384 A | 2/1995 |
| JP | 7-253340 | 10/1995 |
| JP | 8-168693 | 7/1996 |
| JP | 9-203407 | 8/1997 |

* cited by examiner

Primary Examiner—Frankie L. Stinson
(74) Attorney, Agent, or Firm—Richard C. Litman

(57) ABSTRACT

A load sensing system for maximizing the cleaning efficiency of particulate raw materials such as sand, gravel, rock, ores, etc. in a log washer by sensing the weight of the aggregate in the log washer tank and adjusting the angle of inclination of the tank for cleaning efficiency. The system includes a log washer tank pivoted at its lower end and supported by hydraulic cylinders at its upper end. A high/low pressure sensor detects changes in the weight of the load by changes in hydraulic fluid pressure, and raises or lowers the upper end of the tank when low or high pressure limits are exceeded through solenoid activated hydraulic valves.

6 Claims, 6 Drawing Sheets

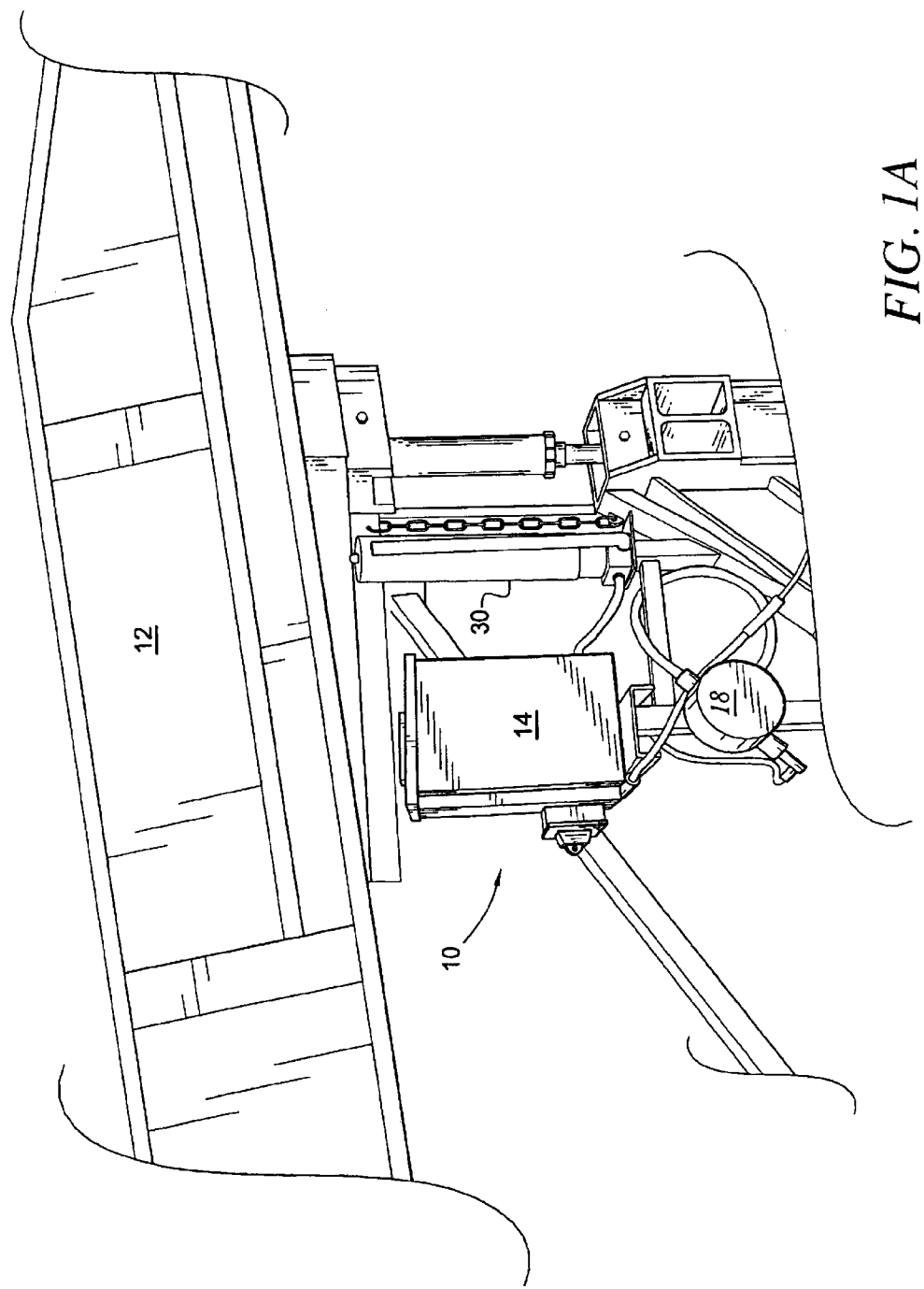

LOAD SENSING SYSTEM

BACKGROUND OF THE INVENTION

1. Field of the Invention

The present invention relates generally to aggregate material cleaning systems. More specifically, the invention is a fully automatic, load sensing system for a log washer which is used for cleaning aggregate materials, such as rocks, gravel, sand, and ores to remove dirt and waste materials. The system hydraulically changes the angle of incline of the washer tank to ensure that the washer tank is properly loaded with the solids for efficient cleaning action.

2. Description of the Related Art

The related art of interest describes various washing and weighing apparatus, but none recognizes the washing inefficiency problem and none discloses the present invention. There is a need for a log washer for washing sand, gravel, ores, and similar particulate material to maximize the cleaning action based upon variations in the weight of the load being cleaned. The problem exists because in conventional log washers the inclination angle of the washer tank is fixed, whereas the load fluctuates. As a general rule, if the angle of incline of the tank is increased, production is decreased but the cleansing action of the washer is increased. Conversely, if the angle of incline of the washer is decreased, production is increased, but the cleansing action is decreased. Currently, the only way to vary the angle of incline is by manually increasing or decreasing the height of the structure supporting the washer tank, a labor intensive process which involves temporarily shutting down the log washer while the supports are adjusted. Therefore, by automatically adjusting the incline of the washer tank according to the load of solids, adequate cleaning is accomplished to maximize the efficiency of the washing process. The related art will be discussed in the order of perceived relevance to the present invention. No art discloses the critical feature of automatically adjusting the incline of the washer or separator tank to adjust to the weight of the solids load in the washer.

U.S. Pat. No. 3,807,558 issued on Apr. 30, 1974, to Alton B. Hamm describes an apparatus for separating lightweight debris from sand, gravel and logs comprising flowing water at a high velocity in a restricted flow path to one side of the rotating auger and rotating logs. The granular and aggregate material is discharged into the water flow for removing unwanted lightweight debris prior to the movement of the granular and material into the zone of operation of the auger of the sand screw or rotating logs of the log washer. The apparatus's inclination is supported by fixed supports. The apparatus is distinguishable for requiring a restricted water flow path and fixed supports for its inclination angle.

Japan Patent Application No. 7-253340 published on Oct. 3, 1995, describes an apparatus which can automatically perform an aggregate washing step in a pivotal mixing container with a spout and emptying the aggregate material and liquid. The washer apparatus has a pair of supporting legs on a stage, and a base pad that may be rotated via a pivotal shaft in a vertical direction by the supporting legs to empty the contents. The aggregate mixing container has a mixing blade within rotated by a first drive motor which rotates with the container. The second drive motor rotates the mixing container and the first drive motor. The apparatus is distinguishable for being limited to a rotatable emptying feature for a mixing container.

U.S. Pat. No. 4,234,415 issued on Nov. 18, 1980, to Enrique de Tuya Casuso describes an apparatus for separating mixed solids of different specific gravities by means of a liquid medium comprising a rotatable frusto-conical separation chamber having a lighter solid outlet at one end and a heavier solid outlet at the opposite end. A pair of frusto-conical chambers may be utilized to separate solids of three different specific gravities. The apparatus is distinguishable for its structural difference and its different objective of separating mixed solids of at least two different specific gravities.

U.S. Pat. No. 5,868,256 issued on Feb. 9, 1999, to Maynard A. Teppo describes a rotary clay material refiner apparatus comprising a horizontal rotating drum into which clay material and water are fed. The clay material and water form a slurry which is agitated by lifters within the drum. A series of adjustable lifters within the drum refine the slurry by lifting aggregates and rocks out of the slurry and discharging them out of the refiner apparatus. The refined slurry exits the drum through an opening and further processed. The apparatus is distinguishable for being confined to a horizontal rotating drum and requiring two separation steps.

U.S. Pat. No. 2,489,161 issued on Nov. 22, 1949, to William Scholes describes a gravity liquid separator apparatus for the separation of unspecified granular or lump material, comprising a tank minus an outlet wall and the bottom inclined up from the deep feeding end, wherein the material is fed from the bottom of the deep end by a continuous belt passing through an opening with a trailing rubber fabric sealing flap or an inflated pneumatic tube to minimize leakage. A rotary scraper is positioned midway in the apparatus. The apparatus is distinguishable for requiring a rotating material transporting belt inside the tank.

U.S. Pat. No. 2,336,991 issued on Dec. 14, 1943, to Chester I. Leveke describes an apparatus for removing dirt, clay, shale, coal and the like material from gravel comprising an inclined elongated trough having a square cross-section, a substantially open top, a bottom gravel outlet in the forward end and a hopper, and a gravel escape slot at the opposite end. A centered rotating cylindrical agitator having agitating blades and three portions of decreasing diameter to the outlet. The apparatus is distinguishable for lacking any inclination adjustable means.

U.S. Pat. No. 1,972,195 issued on Sep. 4, 1934, to Marmaduke J. Lacy, Jr. describes an ore washer apparatus for washing ores such as phosphates, manganese and iron or concrete aggregates containing clay, chips, and silt in a fixed inclined frame. The moving gear comprises 5 parallel chains bearing plow share blades rotating on three sprocket wheels to define a triangle as viewed from the side. The ores are added in the baffled rear end and pushed to the front end in water for discharge out of the water via a discharge throat. The apparatus is distinguishable for requiring an immovable fixed tank.

U.S. Pat. No. 1,695,021 issued on Dec. 11, 1928, to Samuel R. Puryear describes an apparatus for separating solids comprising a substantially rectangular inclined tank with an enlarged rear end and twin screws. The solids such as mud balls mixed with gravel, lignite, coal, shale, and shells are fed with water from a chute into the rear end of the tank. The lighter materials are flushed by water jets toward an adjustable wier and into a perforated conduit leading to a rear trough. The twin screws carry the heavier material up the inclined tank out of the water and into a delivery chute. The apparatus is distinguishable for requiring a rear separation trough and directional jets of water.

U.S. Pat. No. 2,025,841 issued on Dec. 31, 1935, to Charles H. Young describes an apparatus for washing gravel to remove shale, lignite, bark, water-logged wood, and coal comprising an inclined tank on a frame support, and having a pair of screw conveyors which accept the heavier gravel feed from a shallow pan which discharges the heavier material in the rear. The screw conveyors move the gravel through water to an outlet. Jets of water are also supplied continuously upward through the mixture from a bottom pipe. The apparatus is distinguishable for requiring a fixed support.

U.S. Pat. No. 4,448,678 issued on May 15, 1984, to Cecil C. Gentry describes an apparatus for lignite beneficiation comprising an inclined treatment trough having a two-section conveyor screw consisting of a notched screw in the front and a helical screw. In the rear of the trough, crushed lignite is fed into a settling pool of water having a weir in the rear wall covering an exiting stream, while above the stream waste tailings flow over the rear wall. Water is sprayed above the trough. The lignite product exits at the front portion of the trough. Fixed supports are illustrated to obtain the inclination angle of the trough. The apparatus is distinguishable for requiring a two-section conveyor screw and fixed supports for inclining the trough.

U.S. Pat. No. 1,609,652 issued on Dec. 7, 1926, to John L. McQueen describes a log washer apparatus comprising twin screws having intermeshing paddles with cutting edges for washing sand, gravel, ores, and manganese to remove clay, dirt and waste matter. The apparatus is distinguishable for requiring specific log washer screws.

U.S. Pat. No. 2,050,458 issued on Aug. 11, 1936, to Melvin Ovestrud et al. describes a wheeled apparatus for treating quarried rock or pit run gravel to produce aggregates for concrete construction work comprising, in sequence, an upper scrubber chamber (inclined downward) receiving the raw feed, a coarse and fine particle conveyor, and a dehydrator chamber with an endless conveyor belt. A screen at the end of scrubber chamber filters the smaller particles which pass down a hopper to a crusher. The apparatus is distinguishable for requiring multiple separation elements, a crusher, and lacking any adjustment of the inclination of the scrubber chamber.

U.S. Pat. No. 2,324,549 issued on Jul. 20, 1943, to Paul L. Wigton describes a spiral ore pulp classifier apparatus comprising an upwardly inclined open tank on fixed supports being fed ore pulp into the tank having pool of water and a spiral conveyor. The pool end of the tank has an upper outlet for slime and a bottom outlet for a drain. Sand is discharged from the front end. The apparatus is distinguishable for requiring a fixed inclination.

U.S. Pat. No. 5,992,776 issued on Nov. 30, 1999, to Gianni B. Arcaini et al. describes a process for processing ash from the mass burning of municipal waste utilizing various apparatus comprising a shear-force shredder for the size reduction of bulky items, impact cleaning of ferrous metal items, and a rotary washer for cleaning non-ferrous materials. The ash is sent through an air separation unit to remove, paper, wood, plastic, and other unburned debris before passing the ash to an eddy current separator for non-ferrous material removal. The ash is free of metals values, unburned materials and unshreddables, but must be treated to immobilize certain heavy metals. The ash is recycled through a closed loop to increase removal efficiency of the metals and the homogeneous nature of the recovered treated ash aggregate. The apparatus used in this process is distinguishable for not requiring an inclined separator.

U.K. Patent Application No. GB 2,280,384, published on Jan. 2, 1995, describes a horizontal bucket wheel sand washer with a submerged recovered fine aggregate transporter apparatus so that its movement does not agitate or disturb the flowing water. The submerged transporter may be a screw conveyor or a multi-bladed scraper mounted on a frame reciprocated by rams and guided in elevated return movement over pivoted cams. The apparatus is distinguishable for its required horizontal structure.

Japan Patent Application No. 8-168693 published on Jul. 2, 1996, describes an inclined apparatus to prevent fine aggregate such as sand from being mixed with the muddy water being carried off by a conveyor belt, when the fine aggregate such as sand is taken out from a water tank by a belt conveyor device. The silt is collected in a hopper and to a conveyor belt, while the muddy water is collected in a separate container. The apparatus is distinguishable for lacking any change in the inclination.

Japan Patent Application No. 9-203407 published on Aug. 5, 1997, describes a screw conveyor and washer apparatus comprising multiple washers connected in a single line via microjoints. Multiple screws with individual washers in a single line are attached to a supplying means of unknown material. Each washer is separated in turn at its microjoint part so that the screw with its washer is supplied. The apparatus is distinguishable for its required microjointed structure.

German Patent Application No. DE 19,928,287, published on Dec. 28, 2000, describes a method for disposing excavated waste material by conveying the waste material to a buffer container for delivery to a drum washer wherein coarse particles are separated from finer particles, and the overflow is supplied to a hydro-cyclone screen apparatus for recycle of the fluid and the disposal of the solids to a dump. The apparatus employed is distinguishable for requiring a drum washer and a hydro-cyclone screen.

None of the above inventions and patents, taken either singly or in combination, is seen to describe the instant invention as claimed. Thus, a load sensing system to obtain the proper inclination of the washer tank solving the aforementioned problems is desired.

SUMMARY OF THE INVENTION

The present invention is directed to a load sensing system for log washers for washing coarse materials, such as rocks, sand, gravel, and ores, in order to improve the washing process in an open inclined tank. Conventional log washer apparatus are affected by the angle at which the washer tank is fixed. If the load in the log washer tank becomes too light for the angle of incline of the tank, the cleansing action becomes inadequate. Conventional log washer tanks have no automated mechanism for automatically adjusting the inclination of the tank in response to changes in the load. The present invention automatically changes the angle of incline of the washer apparatus by adding hinges to the lower portion of the tank and hydraulic cylinders to raise and lower the upper portion of the tank in response to changes in pressure caused by the load in the tank.

In the load sensing system of the present invention, the lower end of the log washer tank is mounted on a hinged support and the upper end of the tank is supported by a pair of hydraulic cylinders or rams. A high-low pressure sensor device senses changes in the weight of the load in the tank and activates solenoid switches connected to hydraulic valves and to an electric motor which activates a hydraulic pump in order to raise or lower the hydraulic rams as required.

If the hydraulic pressure is low as read by the high/low pressure sensor, the total weight of the material in the washer tank is considered below the optimum weight desired. Therefore, the low pressure sensor switch will activate a hydraulic pump by a starter motor and a hydraulic valve. This action will create the hydraulic flow that flows through a flow divider circuit to a pair of hydraulic cylinders to increase the incline of the washer tank. The elevated washer tank end will rise until the load weight increases, or until a high limit switch indicates that maximum extension of the rams is reached. Now, the first hydraulic valve will close to hold the washer tank position. When the load increases in weight, the high-low pressure sensor will sense this condition, and will activate a latching relay device to the tank lowering circuit. The lowering valve is activated to let the hydraulic oil back through the divider combiner valve to the oil tank. The lowering valve will lower the washer tank as long as the load in the washer tank is sufficient to activate the high-low pressure sensor.

If the bottommost incline value is not reached, and the load decreases, the low pressure sensor will activate the latching relay in the raising circuit to raise the inclination angle of the washer tank. If the washer tank load reaches the lowest incline limit, the system will operate at the setting of the inclination angle until the low sensor senses the lower pressure of a light load, and activates the latching relay in the tank raising circuit. A needle valve regulates how rapidly the tank lowers. A high pressure relief valve diverts or bleeds off hydraulic oil to return to the oil tank, if the low pressure limit setting is reached. A check valve is required to ensure that the hydraulic oil does not flow in the opposite direction. Thus, the load sensing system operates to maximize the washing process for an open inclined tank with conveyor screws.

Accordingly, it is a principal object of the invention to provide a load monitoring system for monitoring the load absent the water in an inclined log washer tank.

It is another object of the invention to provide a monitoring system for monitoring the load in an inclined log washer tank coupled to a mechanism which raises and lowers the angle of inclination of the tank, which maximizes the washing efficiency of the log washer.

It is a further object of the invention to provide a monitoring system for monitoring the load in an inclined washer tank which is responsive to a high/low pressure sensor connected to a mechanism for raising and lowering the inclination of the tank.

Still another object of the invention is to provide a monitoring system for monitoring the load in a log washer tank which automatically maximizes the efficiency of the log washer through a high/low pressure sensor connected to a hydraulic system for changing the inclination of the tank in response to changes in the load.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is a partial environmental, perspective side view of a portion of the load sensing system applied to the loading of a particulate washing tank according to the present invention.

Similar reference characters denote corresponding features consistently throughout the attached drawings.

DETAILED DESCRIPTION OF THE PREFERRED EMBODIMENT

Figure 1B:
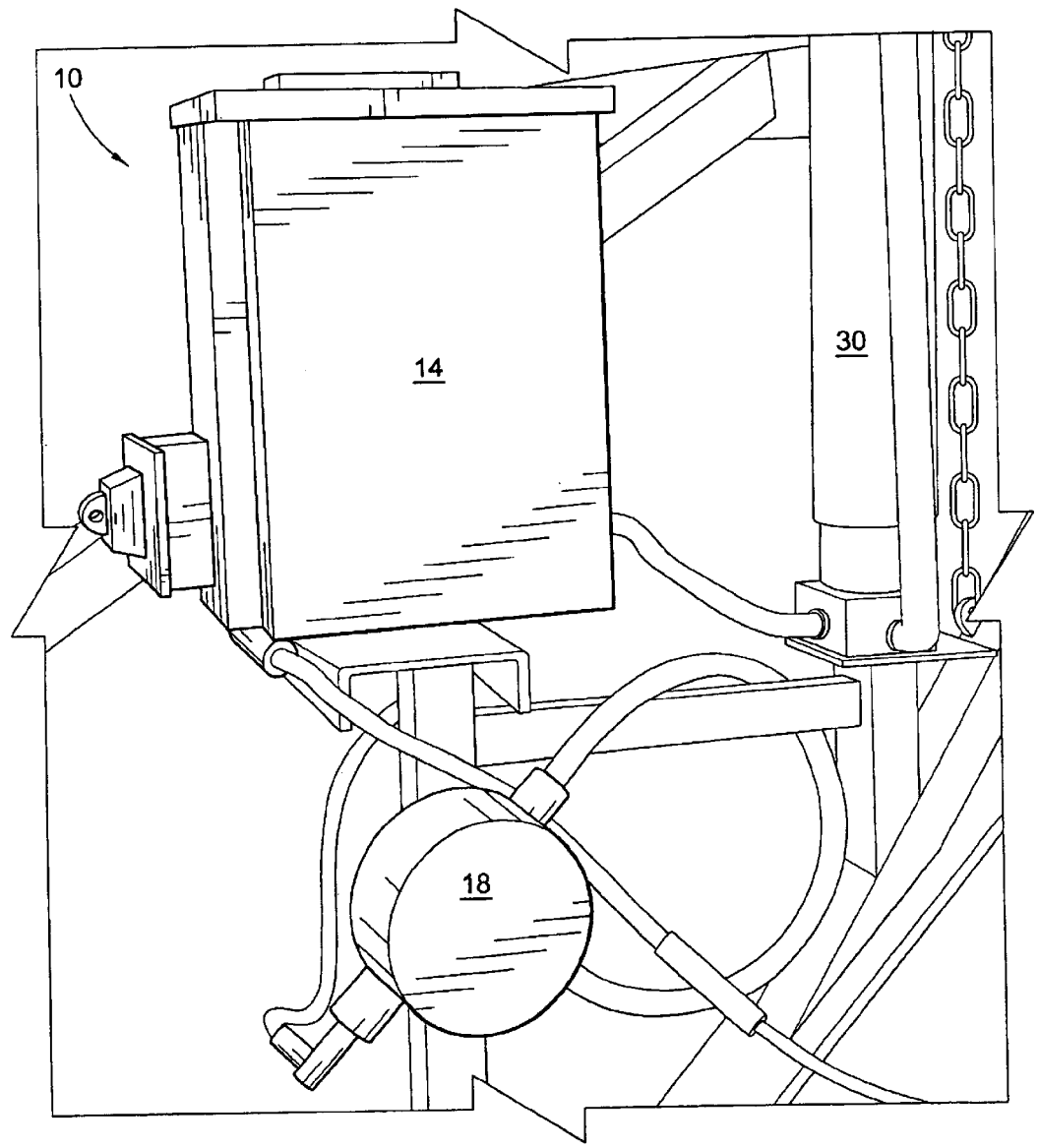
FIG. 1B is an enlarged perspective view of the FIG. 1 portion of the load sensing system applied to the loading of a particulate washing tank according to the present invention.
Figure 2:
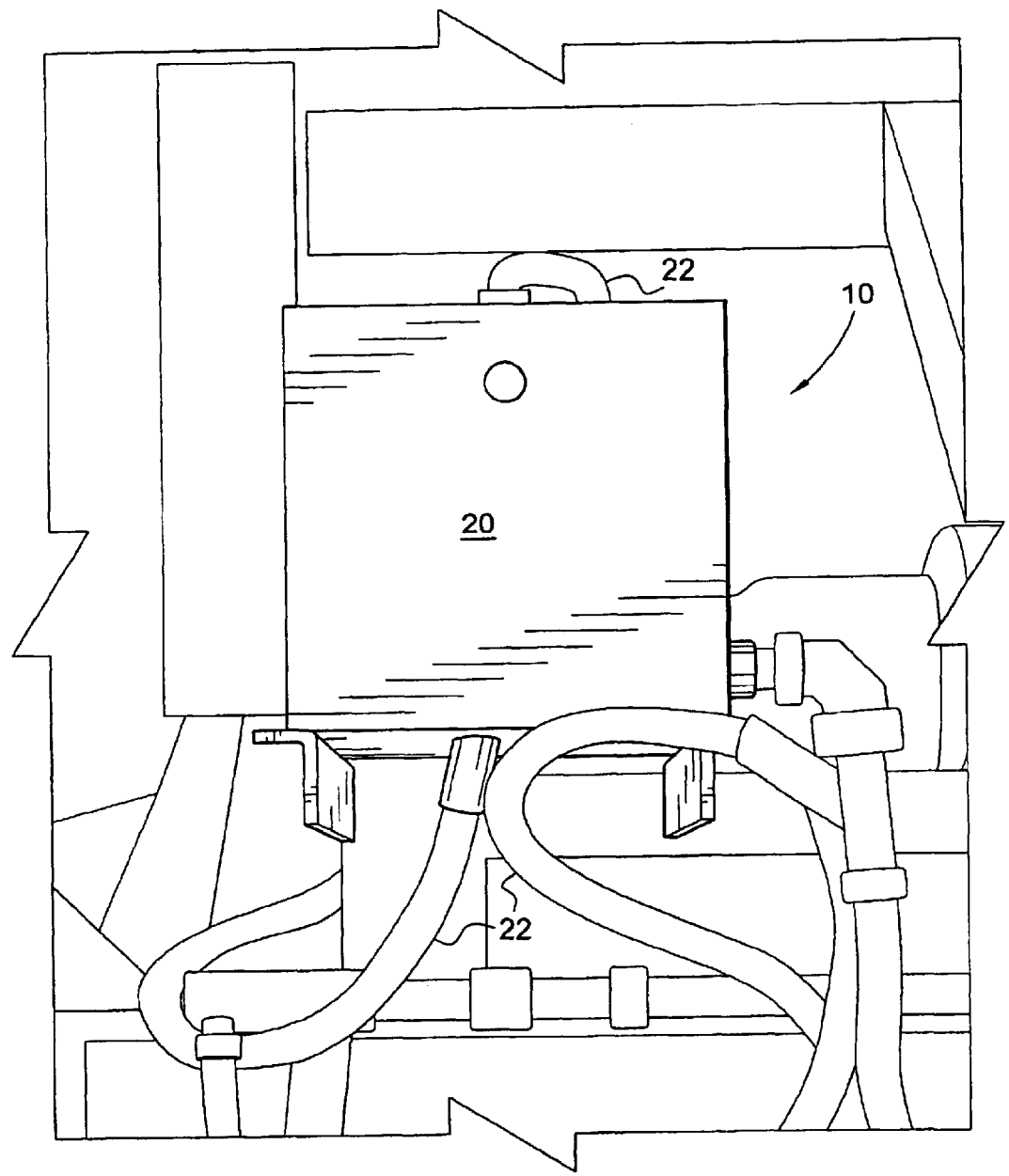
FIG. 2 is an enlarged elevation view of the balance of the monitoring unit employed in the system according to the present invention.
Figure 3:
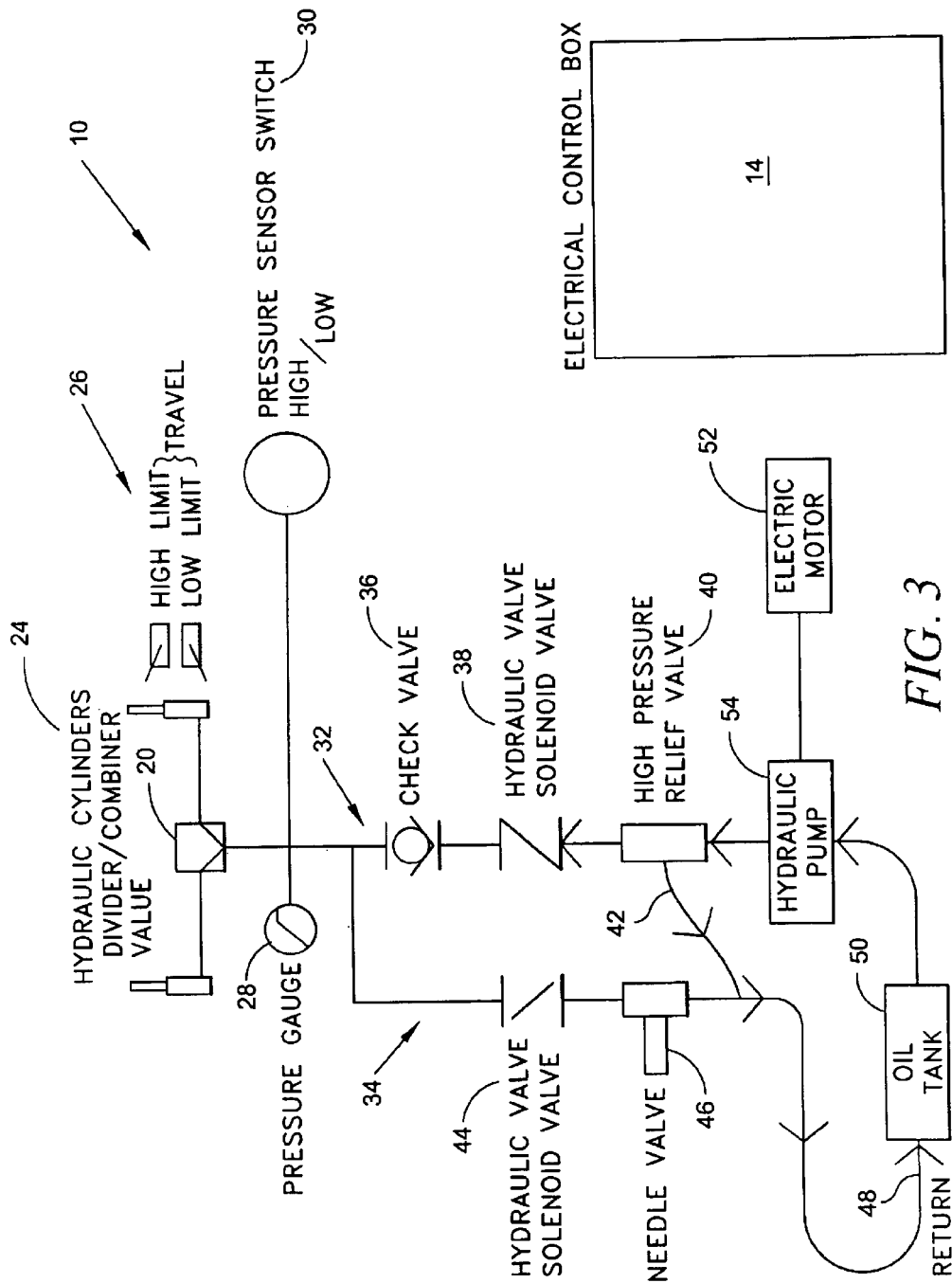
FIG. 3 is a schematic diagram of the various units employed in the hydraulic system according to the present invention.

The present invention in FIGS. 1A, 1B, 2, and 3 is directed to a weight sensing system 10 for a log washer tank for adjusting the inclination of the tank in response to changes in the load of particulate material to be washed in the tank 12, shown partially in FIG. 1A. In FIGS. 1A and 1B, an electrical control box 14 is connected to a pressure module 18 and to a high/low pressure sensor switch 30 (FIG. 3). A boxed divider/combiner valve 20 is depicted in FIGS. 2 and 3 having a plurality of hydraulic lines 22 connected to a hydraulic pump and reservoir, and also to a pair of hydraulic cylinders 24 for raising and lowering the tank. The hydraulic cylinders 24 are mounted below the upper end of the water tank and on opposite sides of the tank, only one of the cylinders 24 being shown in FIG. 1A, the opposite side being symmetrical. As shown, the cylinders are preferably mounted with the tank bearing on the bottom end of the cylinder and the ram or piston rod resting on a fixed support.

As shown in FIG. 3, the divider/combiner valve 20 controls the hydraulic pressure actuating the two hydraulic cylinders 24 equally. A predetermined high elevation limit and a low elevation limit in terms of the ram or piston rod travel is set by conventional mechanical levers which trigger high-low electrical switches 26. A hydraulic line from the divider/combiner valve 20 communicates with a pressure gauge 28 and a high/low pressure sensor switch 30. The hydraulic line divides to a high pressure circuit 32 and a low pressure circuit 34. The high pressure circuit 32 includes in sequence a one-way check valve 36 to prevent back flow from the cylinders 24 to the pumps 54 but which will open on excessive pressure from the pump 54 to raise the cylinders 24, a normally closed hydraulic valve/solenoid element 38, and a high pressure relief valve 40 which dumps off excessive hydraulic pressure through line 42 to the low pressure circuit 34. The low pressure circuit 34 consists of a normally closed hydraulic valve/solenoid 44, a needle valve 46, a hydraulic fluid return line 48 which also receives fluid from the hydraulic line 42 to flow to the hydraulic oil supply tank 50. The needle valve 46 regulates how quickly the tank 12 is lowered. When hydraulic fluid is required for raising the hydraulic cylinders 24 by signal from the high/low pressure sensor switch 30, an electric or diesel motor 52 is energized by the electrical control box 14 to start and run an auxiliary hydraulic pump 54 to increase the hydraulic pressure to the pair of hydraulic cylinders 24 to elevate the washer tank 12 to the predetermined degree of inclination.

As the load in the upper end of the washer tank increases, the additional weight bearing on the bottom ends of hydraulic cylinders 24 increases hydraulic fluid pressure in the system. When the hydraulic pressure exceeds a predetermined high pressure limit, the high/low pressure sensor switch triggers the solenoid connected to hydraulic valve 44 in the return lines 34 to open the valve 44 to release fluid from the cylinders 24, thereby lowering the tank until the hydraulic pressure does not exceed the high pressure limit or until the maximum low level limit of ram or piston rod travel is reached. This action increases production flow through the log washer tank, but adequate cleaning is maintained by the greater quantity of particulate matter providing the scrubbing action in the tank. When the hydraulic pressure is under a predetermined high pressure limit, the high/low pressure sensor switch triggers the solenoid connected to hydraulic valve 38 to open the valve 38 to increase fluid flow into the cylinders 24, thereby raising the tank until the hydraulic pressure exceeds the low pressure limit or until the maximum high level limit of ram or piston rod travel is reached. The action slows production flow through the log washer tank, but increases the scrubbing time to compensate for the reduced volume of particulate matter to maintain adequate cleaning of the particulate matter.

Alternatively, the high/low pressure sensor 30 for measuring variations in hydraulic pressure under differing loads can be replaced by a sensor which measures the variations in amperage required to drive the logs at constant speed under differing load conditions.

Figure 4:
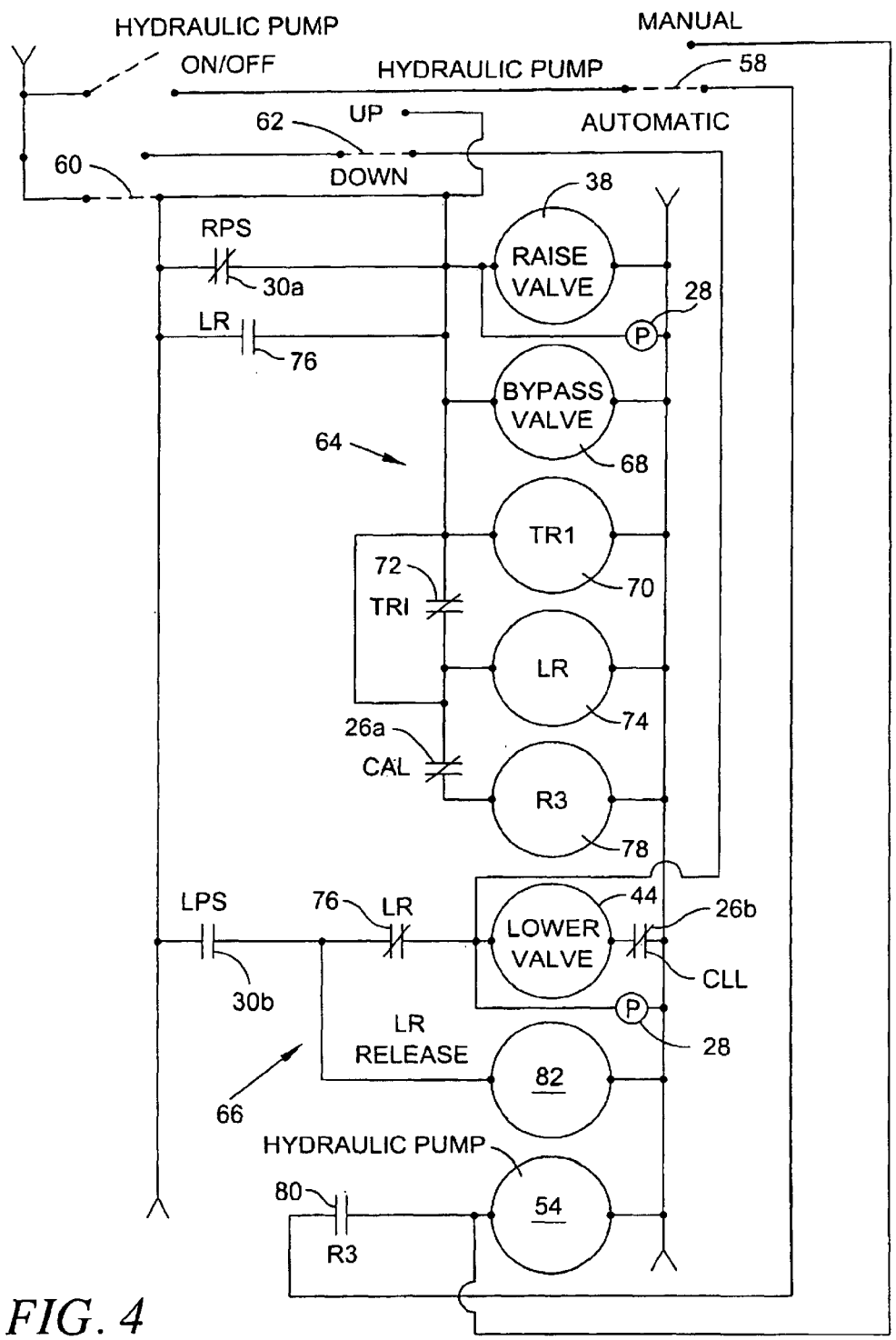
FIG. 4 is a schematic diagram of the electrical elements employed in the system according to the present invention.

FIG. 4 shows a partial schematic of the electrical control system for raising and lowering the hydraulic cylinders 24. The circuit includes a power switch 56 for the hydraulic pump 54. A pair of switches 58 and 60 (or alternatively a double pole, double throw switch) are included for switching between automatic and manual activation of the hydraulic pump 54 and raising and lowering of the hydraulic cylinders 24. Another switch 62 is provided for selecting between raising and lowering the cylinders 24 during manual operation. During automatic operation, operation of the circuitry is controlled by the high/low pressure switch 30, which activates the raise cylinder circuitry 64 when the RPS switch 30a is closed and the LPS switch 30b is open, as shown in FIG. 4, or activates the lower cylinder circuitry 66 when the RPS switch 30a is open and the LPS switch 30b is closed, or activates neither the raise cylinder circuitry 64 nor the lower cylinder circuitry when both the RPS switch 30a and LPS switch 30b are open. The state of the RPS 30a and LPS 30b switches is dependent on the load in the tank as sensed by the high/low pressure switch 30.

The raise cylinder circuitry 64 includes appropriate solenoids and relays for raising the cylinders 24, including the solenoid controlled hydraulic valve 38, pressure gauge 28, a bypass valve solenoid 68, a time delay relay including coil 70 and contacts 72, a latching relay including coil 74 and contacts 76, upper cylinder travel limit switch 26a, and a driver relay including coil 78 and contacts 80. The lower cylinder circuitry 66 includes appropriate solenoids and relays for lowering the cylinders 24, including the solenoid controlled hydraulic valve 44, pressure gauge 28, lower cylinder travel limit switch 26b, and latch relay release coil 82.

Figure 5:
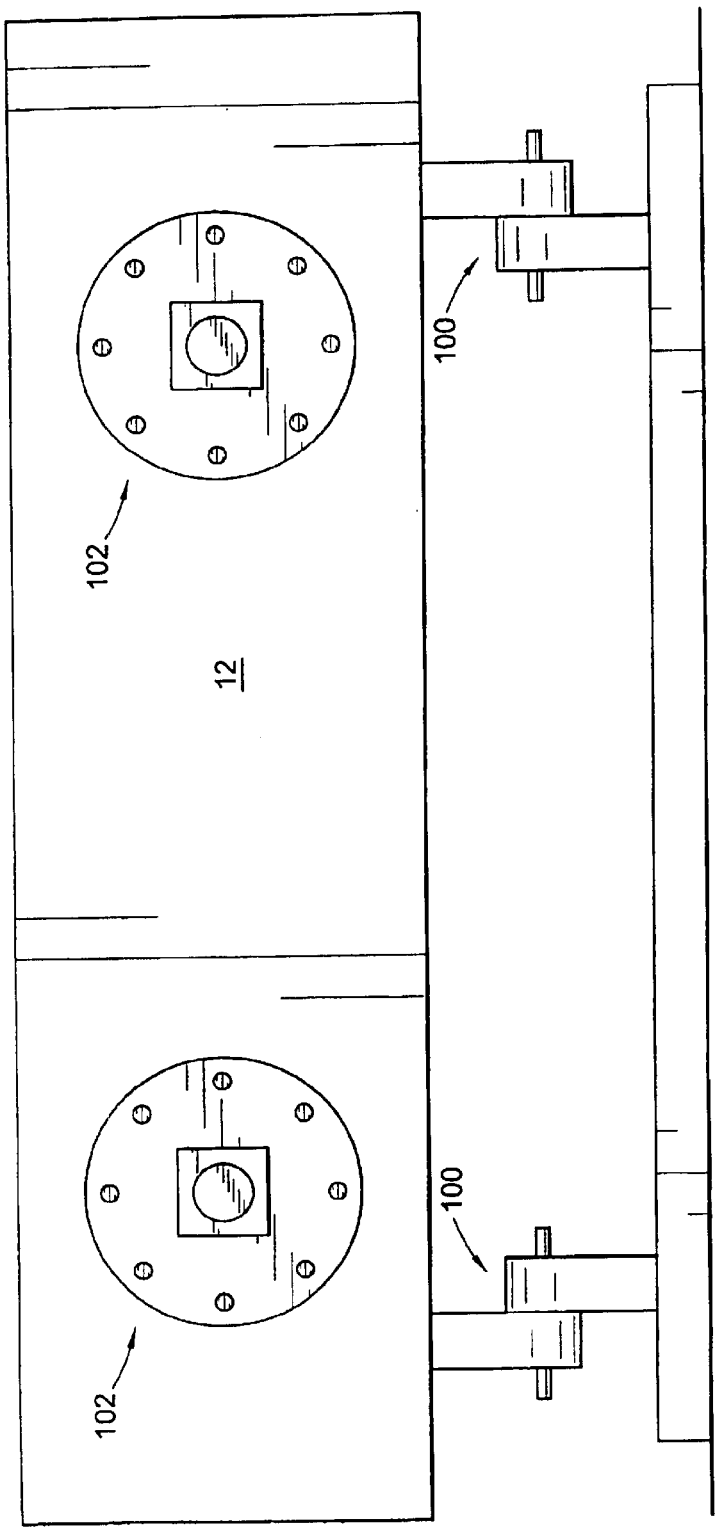
FIG. 5 is an elevational view of the lower end of the washing tank showing the pair of hinges required for adjusting the inclination of the washing tank.

As noted above, FIG. 5 illustrates the pair of hinges 100 mounted at the lower end of the tank 12 which are required to enable the adjustment in the inclination angle of the tank 12 in order to maximize the cleaning action of the wash tank 12 operation. The bearings 102 supporting the lower ends of the two log screws are also shown.

Thus, an effective system for automatically or manually raising and lowering the inclination angle of the tank 12 has been shown for maximizing effective scrubbing of the solids being washed.

It is to be understood that the present invention is not limited to the embodiment described above, but encompasses any and all embodiments within the scope of the following claims.

I claim:

1. A load sensing system for a log washer for washing aggregate materials, comprising:
    a log washer tank having a pivotally mounted lower end and having an upper end;
    a pair of hydraulic cylinders, each hydraulic cylinder having a cylinder base depending from the upper end of the log washer tank and a piston rod attached to a fixed ground support, the hydraulic cylinders being disposed on opposite sides of the log washer tank;
    a combiner/divider valve connected to the pair of hydraulic cylinders;
    a hydraulic pump and a hydraulic fluid reservoir connected to the combiner divider valve for pumping fluid to and receiving fluid from the combiner/divider valve for extending and retracting the piston rods;
    a high/low pressure sensor switch disposed between said hydraulic pump and said combiner/divider valve, the sensor switch having a first state when hydraulic pressure exceeds a high pressure limit, a second state when hydraulic pressure falls below a low pressure limit, and a third state when hydraulic pressure is between the high pressure and low pressure limits;
    raising means for extending the piston rods of the pair of hydraulic cylinders when hydraulic pressure falls below the low pressure limit; and
    lowering means for retracting the piston rods of the pair of hydraulic cylinders when hydraulic pressure is above the high pressure limit;
    whereby the log washer tank is raised and lowered to an angle of incline with only the aggregate material load for promoting efficient washing in response to changes in weight of the load.

2. The load sensing system according to claim 1, further comprising a check valve disposed between said hydraulic pump and said combiner/divider valve for preventing back flow of hydraulic fluid through said hydraulic pump.

3. The load sensing system according to claim 1, further comprising a high pressure relief valve disposed between said hydraulic pump and said combiner/divider valve for diverting hydraulic fluid to said hydraulic reservoir when hydraulic pressure produced by said hydraulic pump exceeds a high pressure limit.

4. The load sensing system according to claim 1, wherein said raising means comprises a hydraulic valve disposed between said hydraulic pump and said combiner/divider valve, the hydraulic valve having a solenoid connected to said high/low pressure sensor for opening and closing the hydraulic valve.

5. The load sensing system according to claim 1, wherein said lowering means comprises a hydraulic valve disposed between said hydraulic reservoir and said combiner/divider valve, the hydraulic valve having a solenoid connected to said high/low pressure sensor for opening and closing the hydraulic valve.

6. The load sensing system according to claim 1, further comprising a needle valve disposed between said combiner/divider valve and said hydraulic reservoir for regulating the flow rate of hydraulic fluid to said hydraulic reservoir.

* * * * *